Aug. 26, 1924.
C. R. MOORE
GAUGE COCK
Filed March 16, 1923
1,505,965
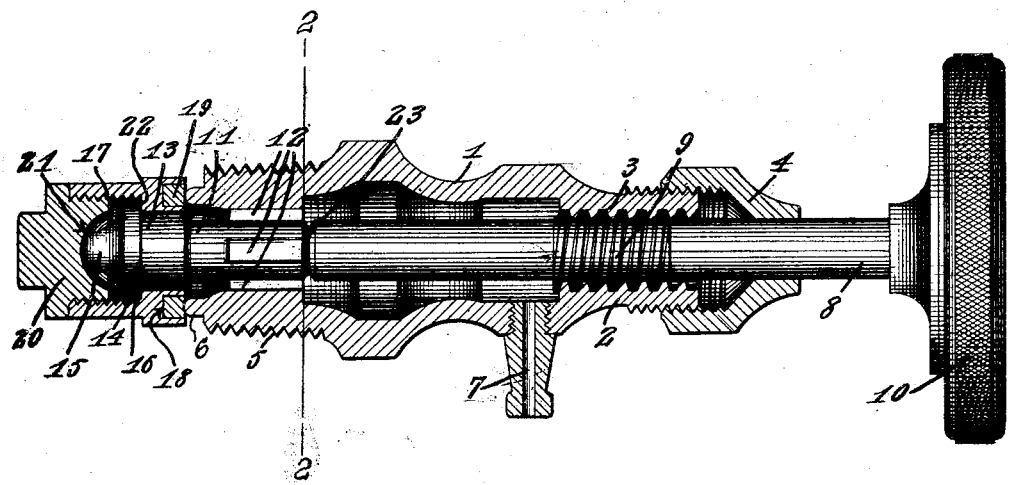
C. R. Moore, Inventor
By C. A. Snow & Co.
Attorneys Patented Aug. 26, 1924.

1,505,965

UNITED STATES PATENT OFFICE.

CHARLES R. MOORE, OF NEWPORT, VERMONT.

GAUGE COCK.

Application filed March 16, 1923. Serial No. 625,512.

*To all whom it may concern:*

Be it known that I, CHARLES R. MOORE, a citizen of the United States, residing at Newport, in the county of Orleans and State of Vermont, have invented a new and useful Gauge Cock, of which the following is a specification.

This invention relates to gauge cocks and is designed primarily as an improvement upon the structure disclosed in my Patent No. 531,593 issued to me on December 25, 1894.

One of the objects of the invention is to provide a structure of this character, the parts of which can be assembled readily, the valve per se being connected in a novel manner to the stem whereby the use of an attaching screw or the like is eliminated.

Another object is to provide a gauge cock with a stem so that it can be thrust positively off of its seat without danger of breaking or distorting any of the parts.

Another object is to so construct the valve of the gauge cock that the packing ring forming a part of the valve will not be subjected to the wearing action of the stem when rotated relative to the valve, but will only contact with its seat, thus reducing wear to the minimum.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing which is a longitudinal section through the gauge cock, the preferred form of the invention has been shown.

Referring to the drawing by characters of reference, 1 designates the tubular casing of the gauge cock, the same being formed at one end with a reduced portion 2 having interior threads shown at 3 and adapted to be engaged by a cap 4. The other end of the casing is exteriorly screw threaded as at 5 so as to engage the wall of a boiler or other structure and extending from this end of the casing is an annular rib 6 forming the seat of the valve.

A nipple 7 is extended from the casing between the ends thereof.

Mounted for rotation within the casing is the valve stem 8 having a threaded portion 9 engaging the threads 3. The outer end of this stem has a hand wheel 10 whereby it can be rotated readily. The other end 11 of the stem has longitudinal ribs 12 adapted to rotate within one end portion of the casing 1 and serving to hold the stem centered in the casing without, however, interfering with the free flow of steam. This ribbed portion also acts as a scraper for keeping the inner surface of the adjacent portion of the casing 1 clean, so that danger of the valve becoming clogged is eliminated.

The stem 8 projects beyond the ribbed portion 11 thereof to provide an enlarged cylindrical portion 13 located at the inner end of a head 14. The head has a knob-like extension 15.

Fitted on the enlarged portion 13 of the stem is the cylindrical body portion 16 of the valve, the same having one end interiorly screw threaded as at 17 while its other end has an annular groove 18 in which is provided a ring 19 of soft metal constituting a packing. A screw plug 20 is detachably mounted within the valve 16 and engages the threads 17, this plug being formed with a recess 21 adapted to receive the knob 15. An internal annular shoulder 22 is provided in the valve 16 for engagement with one face of the head 14. Thus, when the plug 20 is screwed into place, the head will be clamped between the shoulder 22 and the wall of recess 21 so that a swivel connection is thus provided between the stem 8 and the valve.

It will be noted that the external diameter of the valve is less than the external diameter of the threaded portion 5. Thus the valve can be inserted readily into the tapped opening provided for the threaded portion 5.

By removing the wheel 10 from the stem 8, said stem can be unscrewed from the threads 3 and withdrawn longitudinally from the casing 1. By then unscrewing the plug 20, the valve 16 can be slipped over the ribbed portion 11 of the stem and thence longitudinally off of the stem. By reversing the foregoing operation, the parts can be reassembled.

It will be noted that when the stem 8 is rotated in one direction, the cooperating threads 3 and 9 will draw the valve 16 so as to force the ring 19 against seat 6. By reversing the rotation of stem 8, the knob 21 will thrust against the plug 20 and force the valve off of its seat. As the ring 19 is spaced from the stem it is not subjected to any wear other than that caused by its movement into and out of contact with its seat.

By constructing the parts as described, it will be apparent that should the casing 1 break off on the line 2—2 and the stem 8 also break off at this point, where it is preferably weakened as shown at 23, the pressure back of the valve will cause it to seat automatically, the ribbed portion 11 holding the valve properly centered so as to guide it to its seat. Thus danger of scalding as a result of an accident breaking-off of the gauge cock is eliminated.

What is claimed is:—

In a gauge cock the combination with a casing having a valve seat at one end, and a stem projecting through and beyond the ends of the casing, of cooperating screw threads upon the stem and casing, a head at one end of the stem having an annular enlargement, a tapered knob projecting from the enlargement, a valve rotatably engaged by the head on the stem and having an internal annular shoulder constituting a thrust bearing for the enlargement, a screw plug adjustably seated in the valve and closing one end thereof, said plug having a concave recess, the center portion of the wall of which constitutes the sole means for receiving thrust from the knob to shift the valve from the seat on the end of the casing.

In testimony that I claim the foregoing as my own, I have hereto affixed my signature in the presence of two witnesses.

CHARLES R. MOORE.

Witnesses:
 ERNEST A. SPOONER,
 H. S. ROOT.